United States Patent [19]

Inoue et al.

[11] Patent Number: 4,847,108

[45] Date of Patent: Jul. 11, 1989

[54] DOUGH IMPROVER

[75] Inventors: Seijiro Inoue, Ami; Shigenori Ohta, Komae; Makoto Egi, Asahi, all of Japan

[73] Assignee: Kyowa Hakko Kogyo Co., Ltd., Tokyo, Japan

[21] Appl. No.: 129,358

[22] Filed: Nov. 30, 1987

Related U.S. Application Data

[63] Continuation of Ser. No. 814,972, Dec. 31, 1985, abandoned.

[30] Foreign Application Priority Data

Jan. 12, 1985 [JP] Japan .................................. 60-3733

[51] Int. Cl.$^4$ .............................................. A21D 2/00
[52] U.S. Cl. .................................... 426/653; 426/549; 426/654
[58] Field of Search ........................ 426/653, 654, 549

[56] References Cited

U.S. PATENT DOCUMENTS 4,200,569  4/1980  Ladbrooke et al. ................ 426/656

FOREIGN PATENT DOCUMENTS 2915449  10/1979  Fed. Rep. of Germany ...... 426/653
2019188  10/1979  United Kingdom .

*Primary Examiner*—R. B. Penland
*Attorney, Agent, or Firm*—Antonelli, Terry & Wands

[57] ABSTRACT

A dough improver composition for improving the quality of bread, cake and the like baked products, contains a vital gluten, and emulsifier and complex of the vital gluten and an emulsifier. The proportion of emulsifier in the complex to the dough improver composition is 1 to 20%, and the complex is obtained by mixing a vital gluten with a hydrated emulsifier in such a proportion that the water content in the mixture is in the range of from 10 to 35%, and allowing the mixture to stand.

1 Claim, No Drawings

DOUGH IMPROVER

This application is a continuation of application Ser. No. 814,972, filed Dec. 31, 1985 now abandoned.

The present invention relates to a dough improver, i.e., a composition for improving the bread-making performance of a flour dough. More particularly, the present invention relates to a dough improver obtained by mixing vital gluten and a hydrated emulsifier and allowing the mixture to stand.

U.S. Pat. No. 3,362,829 discloses that powder of vital gluten, if mixed with a molten emulsifier at 68° to 70° C., shows excellent dispersibility in water.

Since mixing is conducted in the absence of water in this method, the emulsifier does not complex with gluten protein (U.S. Pat. No. 4,200,569), and hence it is not expected to show remarkable effect of improving food quality.

U.S. Pat. No. 3,880,824 discloses that powder of vital gluten, if mixed with an emulsifier in an inert organic solvent, shows excellent dispersibility in water.

Since the emulsifier in this case also does not complex with gluten protein (U.S. Pat. No. 4,200,569), it is not expected to exhibit excellent effect of improving food quality.

U.S. Pat. No. 4,035,519 discloses that the vital gluten obtained by mixing wet gluten (water content: 45 to 65%) with a molten emulsifier at 45° to 65° C., followed by drying, disperses in water more readily and shows slightly better bread-quality improving effect compared with ordinary vital gluten.

The product obtained by this method is no more than emulsified gluten, with no complex being formed between an emulsifier and gluten protein (U.S. Pat. No. 4,200,569). In addition, since a mass of wet gluten (water content: 45 to 65%) is used as starting material, intimate mixing with an emulsifier is very difficult, requiring, in commercial production, special equipment and huge energy outlays.

Japanese Published Unexamined Patent Application No. 102148/82 discloses that powder of vital gluten with good dispersibility in water can be obtained by intimately mixing wet gluten (water content: 50 to 80%) with a phospholipid-containing compound, followed by drying and pulverization.

Although this method is effective in improving the dispersibility of the dough in water, no marked effect can be expected for improving the food quality, particularly the breakmaking quality.

U.S. Pat. No. 4,200,569 discloses that complexes between gluten protein and an anionic emulsifier show an excellent film-forming property and serve as a dough improver in breakmaking. The complexes of this type are obtained by reaction of gliadin (substantially in solution state) with an anionic emulsifier, or by mixing wet gluten (water content: 60% or higher) with a hydrated anionic emulsifier under vacuum. This method requires mixing under vacuum and is not advantageous economically. Furthermore, as the patent states, the effective emulsifier is limited only to anionic emulsifiers such as sodium dodecylsulfate, diacetyltartaric acid ester of monoglyceride and palmitoyl-1-aspartic acid ester, and no complex can be formed from the other anionics (e.g., calcium stearoyl-lactylate, and succinic acid ester of monoglyceride) and nonionics (e.g., fatty acid ester of sucrose, and monoglycerides). Sodium dodecylsulfate, which is the most effective, is not placed in service in food processing. Hence, there are limitations upon the use to which this patent may be applied on a commercial basis.

It is an object of the present invention to provide a dough improver which has a good effect of improving the quality of bread and cake. According to the present invention, it is possible to obtain an excellent dough improver containing a complex of a vital gluten and an emulsifier, wherein the proportion of emulsifier in the complex (hereinafter referred to as bound emulsifier) to the dough improver is 1 to 20%, which complex being obtained by mixing a vital gluten with a hydrated emulsifier in such a proportion that the water content in the resulting mixture is in the range of from 10 to 35%, and allowing the mixture to stand.

Commercial, dry or wet gluten is used as vital gluten of the present invention. Anionic and nonionic emulsifiers are used as emulsifiers.

Examples of anionic emulsifiers include calcium stearoyl-lactylate, sodium stearoyl-lactylate, diacetyltartaric acid ester of monoglyceride, succinic acid ester of monoglyceride, citric acid ester of monoglyceride and the like. Typical examples of the nonionic emulsifier include fatty acid ester of sucrose. These emulsifiers are used either alone or in combination. The emulsifier is used in the form of a hydrate to accelerate the reaction of the gluten protein with the emulsifier.

A hydrate of an emulsifier is obtained by adding water to the emulsifier (at 50°–70° C.) to a concentration of 5 to 20% (W/W) and stirring the mixture at a temperature of 50°–70° C. while maintaining the pH at 5 to 7. A homogenizer or the like is employed, if necessary, to ensure forced hydration. The dough improver of the present invention is obtained as described below by using a hydrate of emulsifier prepared above.

A 5 to 20% (W/W) of hydrated emulsifier (the percentage represents the concentration of emulsifier in its hydrated form, and the same shall apply hereinafter) is added to dry vital gluten, or to a mixture of dry vital gluten with a wet vital gluten, in such a proportion that the water content in the resulting mixture is in the range of from 10 to 35%, and the mixture is allowed to stand at 20° to 70° C., preferably at 40° to 60° C., for 5 to 30 minutes, followed, if necessary, by freeze-drying or flash-drying. The dough improver thus obtained contains 1 to 30%, preferably 5 to 20%, of emulsifier on a dry basis. When the emulsifier concentration is to be further enhanced, this procedure is accomplished by pulverizing a dry product, further adding 5 to 20% hydrated emulsifier to the pulverized product, and treating the mixture in the same manner as above.

The dough improver obtained by the method described above contains a complex of a vital gluten and an emulsifier. The proportion of emulsifier in the complex to the dough improver is 1 to 20%. The dough improver of the present invention is added to dough in an amount of 0.5 to 10% on a dry basis of wheat flour.

The analytical and testing methods used in the present invention are described below.

(1) ANALYSIS OF FREE AND BOUND EMULSIFIER

Lipids are generally classified into two types by the state in which they exist in living bodies: bound lipids which complex with protein, and free lipids which do not complex. The latter can be extracted with a nonpolar organic solvent, while the former cannot be extracted with a nonpolar organic solvent but can be extracted with a polar organic solvent. In the present invention, the emulsifier which can be extracted from dough improvers with chloroform is defined as "free emulsifier", the emulsifier which can be extracted with chloroform-methanol mixed solvent (2:1 by volume) is taken as "total emulsifier", and the amount of bound emulsifier is calculated by the following equation [Y. Pomeranz, "WHEAT; Chemistry and Technology (92nd edition)", p. 393-395, published from American Association of Cereal Chemists]:

Bound Emulsifier=Total Emulsifier−Free Emulsifier

Analytical methods adopted are hereinafter described.

(a) Free emulsifier

A dough improver of the present invention (20.0 g) was accurately weighed and extracted with 200 ml of chloroform at room temperature for 20 minutes with mechanical agitation. The extract was suction-filtered through a filter paper (Toyo Filter Paper No. 50), and the residue was again extracted with 200 ml of chloroform in the same manner as above. The two filtrates were combined and the combined solution was concentrated under reduced pressure. The residue was dried at 60° to 70° C. until chloroform was substantially removed from the residue. Al aliquot sample of chloroform extract was taken and its total nitrogen was measured by the micro Kjeldahl method. The amount of protein contained was calculated by multiplying the total nitrogen by the coefficient, 5.7. The amount of free emulsifier was obtained by subtracting the amount of protein from the total amount of extract.

(b) Total emulsifier

Analyzed in the same manner as in (a) above, except that a chloroform-methanol mixed solvent (2:1 by volume) was used as solvent in place of chloroform.

(2) BREADMAKING TEST

Sample bread was made by the 70% sponge and dough method, using 2%, based on the weight of wheat flour, of a dough improver of the present invention. The amount of water added to the sponge formulation was 252 ml when no dough improver was used, and 264 ml when the dough improver was used.

The specific volume of raised bread was measured by the rapeseed displacement method, and the crumb grain was evaluated by organoleptic examination. Degree of staleness was measured using Baker's Compressimeter after two days' standing at 25° C. and expressed by relative value, with the value of control sample (no dough improver added) taken as 100.

Sponge Materials
```
  Hard wheat flour                     420 g
  Yeast food                           0.6 g
  (containing ascorbic acid)
  Compressed baker's yeast             12 g
  Dough improver of the present        12 g
  inventioin (on dry basis)
```

←── Water (252 ml or 264 ml)

↓

Mixing (Kanto-mixer Model C-10; hook used)

↓

Fermentation (28° C., 4 hours, 85% RH)

↓ ←── Dough Materials

```
  Hard wheat flour        180 g
  Sugar                   30 g
  Salt                    12 g
  Shortening              30 g
```

↓ ←── Water (150 ml)

Mixing (Kanto-mixer Model C-10, hook used)

↓

Floor Time (28° C., 20 minutes, 85% RH)

↓

Dividing (450 g)

↓

Bench Time (Room temperature, 15 minutes)

↓

Moulding and Panning

↓

Proofing (40° C., 85% RH, 1.5 cm above center of pan)

↓

Baking (220° C., 25 minutes)

(3) CAKE MAKING TEST

Sponge cakes were made according to commonly used formulation method (egg:soft wheat flour:sugar=1:1:1). The dough improver was added in an amount of 5% based on the weight of flour. The amount of water added was 105 ml when no dough improver was added, and 120 ml when the dough improver was added.

The specific volume of cakes was measured by the rapeseed displacement method. The crumb grain and texture were evaluated by organoleptic examinations. The softness of the crumb was measured after 24 hours' standing at 15° C. by using a creepmeter (Yamaden, Model RE-3305).

```
  Whole egg               300 g
  Refined sugar           300 g
  Liquid sugar            45 g
  Foaming agent           15 g
  Salt                    1.35 g
  Water                   105 ml of 120 ml
```

↓

Mixing (Kanto-mixer Model C-10; wire whipper used)

↓

```
  Soft wheat flour                      300 g
  Baking powder                         6 g
  Dough improver of this invention      15 g
  (on dry basis)
```

↓

-continued

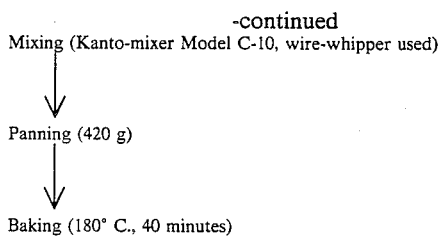

Mixing (Kanto-mixer Model C-10, wire-whipper used)

Panning (420 g)

Baking (180° C., 40 minutes)

Examples and Reference Examples are shown below.

EXAMPLE 1

EXAMPLE 2

Experiments were conducted in a similar manner to Example 1, except that emulsifiers listed in Table 1 were used.

As shown in Table 1, 15% hydrated emulsifier was added in two partitions or portions (water content:23.4% for the first mixture, and 19.0% for the second), and 7.5% hydrated emulsifier was added in four partitions (water content: 24.9% for the first mixture, and 20.4% for the second to the fourth), each giving a dough improver containing about 7.0% emulsifier. The results are shown in Table 1.

TABLE 1

| Dough Improver | B | C | D | E | F |
| --- | --- | --- | --- | --- | --- |
| Emulsifier | Ca stearoyl-lactylate | Diacetyltartaric acid ester of monoglyceride | Succinic acid ester of monoglyceride | Citric acid ester of monoglyceride | Fatty acid sugar ester |
| Trade Name of Emulsifier | Verv (Musashino Chemical | Poem W-10 (Riken Vitamin) | Poem B-10 (Riken Vitamin) | Poem K-37 (Riken Vitamin) | S-1570 (Mitsubishi Kasei Food) |
| Hydrated Emulsifier: | | | | | |
| Composition | | | | | |
| Emulsifier (g) | 2.81 | 5.63 | 3.75 | 5.63 | 2.81 |
| Water (ml) | 32.39 | 31.87 | 31.75 | 29.97 | 34.69 |
| 2N—NaOH (ml) | 2.3 | 9.0 | 2.0 | 1.9 | 0 |
| Emulsifier (w/w %) | 7.5 | 15.0 | 10.0 | 15.0 | 7.5 |
| pH before adjustment | 4.3 | 1.6 | 2.7 | 2.3 | 6.2 |
| pH after adjustment | 6.0 | 6.1 | 6.2 | 6.1 | — |
| Number of addition | 4 | 2 | 3 | 2 | 4 |
| Vital Gluten (g) | 150 | 150 | 150 | 150 | 150 |
| Dough Improver: | | | | | |
| Yield (g) | 149 | 153 | 156 | 153 | 149 |
| Water content (%) | 3.1 | 4.2 | 5.4 | 4.2 | 2.7 |
| Emulsifier content (%) | | | | | |
| Total | 6.5 | 6.8 | 6.9 | 7.0 | 7.0 |
| Free | 2.9 | 4.7 | 5.4 | 5.4 | 4.6 |
| Bound | 3.6 | 2.1 | 1.5 | 1.6 | 2.4 |
| Binding rate (%) | 55 | 31 | 22 | 23 | 34 |

Binding Rate = $\frac{\text{Total Emulsifier} - \text{Free Emulsifier}}{\text{Total Emulsifier}} \times 100$ In this example, 3.75 g of sodium stearoyl-lactylate was added to 32.25 ml of water (60° C.) and an aqueous dispersion (pH: 4.6) was obtained. After adjusting the pH to 6.31 by addition of 1.5 ml of 2N-NaOH solution the mixture was stirred at 60° C. for 20 minutes to prepare 10% hydrate of sodium stearoyl-lactylate. Then, 37.5 g of the hydrate was put to a mixer bowl containing 150 g of commercial vital gluten (water content: 7.7%) and held at 50° C. The mixture was agitated (Shinagawa Kogyo's Universal Mixer/Agitator Model 5DMr; anchor-shape hook used; 65 rpm×2 minutes and 126 rpm×8 minutes) until a homogeneous mixture was obtained (water content: 24.4%). The mixture was freeze-dried, and the dried product was crushed to a particle size finer than 42 mesh. The powder was further added to 37.5 g of 10% hydrated sodium stearoyl-lactylate, and the mixture was freeze-dried and pulverized in the same manner as above.

The above-mentioned procedure wherein to the resultant powder was added 37.5 g of 10% hydrated sodium stearoyl-lactylate and powdered through lyophilization was repeated once more. Totally, 112.5 g of 10% hydrated sodium stearoyl-lactylate was added. Thus, 154 grams of dough improver A containing 7.0% sodium stearoyl-lactylate (water content: 4.6%) was obtained. The dough improver contained 6.7% total emulsifier, 3.5% free emulsifier, and 3.2% bound emulsifier (emulsifier binding rate: 48%).

EXAMPLE 3

At present, powdery vital gluten is produced mainly by flash drying process, in which wet gluten is first mixed with a large amount of powdery vital gluten, followed by pulverization and drying.

This Example shows a case in which a mixture of wet gluten and dry gluten is used as starting material according to flash drying process.

At first, 3 g of sodium stearoyl-lactylate was added to 25.8 ml of water (60° C.), giving an aqueous dispersion. After adjusting the pH to 6.2 by addition of 1.2 ml of 2N-NaOH solution, the mixture was stirred at 60° C. for 20 minutes, affording 10% hydrate of sodium stearoyl-lactylate. Then, 180 g of commercial, dry vital gluten (water content: 7.7%) and 60 g of wet vital gluten (water content: 67%) were thoroughly mixed at 50° C. in advance. Then, 30 g of the hydrated sodium stearoyl-lactylate prepared above was added, and the mixture was agitated at 50° C. into a homogeneous state. The homogeneous mixture (water content: 30.2%) was freeze-dried, and the dried product was crushed to a particle size finer than 42 mesh. To the thus obtained powder were added wet vital gluten and 10% hydrated sodium stearoyl-lactylate in a respective amount identified in Table 2, the second mixing. The mixture was treated in the same manner as described above to obtain a powder. Adding vital gluten and 10% hydrated sodium stearoyl-lactylate in an amount identified at the third to fifth mixings, the above-mentioned procedure was repeated further three times, yielding 334 g of dough improver G containing 7.0% sodium stearoyl-lactylate (water content: 3.5%). This dough improver contained 6.8% of total emulsifier, 3.3% of free emulsifier, and 3.5% bound emulsifier (emulsifier binding rate: 51%).

TABLE 2

| Number of Mixing | Materials Charged | | | Water content at mixing (%) | Yield of mixt. (dough improver) (g) |
|---|---|---|---|---|---|
| | Dry gluten (g) | Wet gluten (g) | 10% Hydrated Na stearoyl-lactylate (g) | | |
| 1 | 180 | 60 | 30 | 30.2 | 197 |
| 2 | 197 | 66 | 32 | 26.7 | 225 |
| 3 | 225 | 75 | 36 | 26.6 | 257 |
| 4 | 257 | 86 | 42 | 26.8 | 293 |
| 5 | 293 | 98 | 48 | 26.8 | 334 |

(Note) As dry gluten, used was commercial vital gluten in the first mixing, and the mixture obtained from the preceding step for the second to the fifth mixing.

REFERENCE EXAMPLE 1

The effects of dough improvers A, F and G, obtained in Examples 1, 2 and 3 respectively, were compared with those of powder mixtures of vital gluten with emulsifiers. Table 3 lists the test groups, and Table 4 summarizes the properties of final doughs and the quality of final products after two days' storage.

TABLE 3

| Test Group | Additive | Amount added (wt. %) (per total flour) |
|---|---|---|
| I | None | — |
| II | Commercial vital gluten Na Stearoyl-lactylate | 2 0.15 |
| III | Dough improver A | 2 |
| IV | Commercial vital gluten Fatty acid sugar ester, S-1570 | 2 0.15 |
| V | Dough improver F | 2 |
| VI | Dough improver G | 2 |

TABLE 4

| | Test Group | | | | | |
|---|---|---|---|---|---|---|
| | I | II | III | IV | V | VI |
| Dough Properties: | | | | | | |
| Elasticity | ○ | ○ | ○~◉ | ○ | ◉ | ○~◉ |
| Extensibility | ○ | ○~◉ | ◉ | △~○ | ○ | ◉ |
| Anti-stickiness | △ | ○ | ◉ | △~○ | ○ | ◉ |
| Moldability | △~○ | ○ | ◉ | ○ | ○~◉ | ◉ |
| Product Quality: | | | | | | |
| Specific volume | 4.75 | 5.12 | 5.29 | 5.18 | 5.32 | 5.25 |
| Film extension of crumb | △~○ | ○ | ◉ | ○ | ◉ | ◉ |
| Crumb grain | ○ | ○ | ◉ | △~○ | ◉ | ◉ |
| Flavor | ○~◉ | ○ | ○~◉ | ○ | ○~◉ | ○~◉ |
| Relative crumb firmness | 100 | 88 | 83 | 93 | 82 | 80 |

(Note) Evaluation standard (organoleptic evaluation by skilled engineers)
◉ Excellent
○ Slightly better
△ Slightly poor
○~◉ Better
△~○ Average As is apparent from Table 4, the dough improvers of the present invention (Test Groups III, V and VI) show better effects than the other Groups.

REFERENCE EXAMPLE 2

The effects of the dough improvers obtained in Examples 1 and 2 were tested. The results are shown in Tables 5 and 6.

TABLE 5

| Test Group | Additive | Amount added (%) (per total flour) |
|---|---|---|
| I | None | — |
| II | Commercial vital gluten | 2 |
| III | Dough improver A | 2 |
| IV | Dough improver B | 2 |
| V | Dough improver C | 2 |
| VI | Dough improver D | 2 |
| VII | Dough improver E | 2 |
| VIII | Dough improver F | 2 |

TABLE 6

| | Test Group | | | | | | | |
|---|---|---|---|---|---|---|---|---|
| | I | II | III | IV | V | VI | VII | VIII |
| Dough Properties: | | | | | | | | |
| Elasticity | ○ | ◉ | ○~◉ | ◉ | ◉ | ○~◉ | ○~◉ | ◉ |
| Extensibility | ○ | △ | ◉ | ○~◉ | ○ | ◉ | ○ | △~○ |
| Anti-stickiness | △ | △~○ | ◉ | ○~◉ | ○ | ◉ | ○~◉ | ○ |
| Moldability | △~○ | ○ | ◉ | ○~◉ | ○ | ◉ | ○ | ○ |
| Product Quality: | | | | | | | | |
| Specific Volume | 4.90 | 5.15 | 5.22 | 5.40 | 5.46 | 5.19 | 5.36 | 5.55 |
| Film extension of crumb | △~○ | △~○ | ○~◉ | ○ | ◉ | ○~◉ | ◉ | ◉ |
| Crumb grain | ○ | △~○ | ○~◉ | ○ | ◉ | ○~◉ | ◉ | ◉ |
| Flavor | ○~◉ | ○ | ○~◉ | ○~◉ | ○~◉ | ○~◉ | ○~◉ | ○~◉ |
| Relative crumb firmness | 100 | 93 | 78 | 85 | 84 | 88 | 78 | 75 |

(Note) Evaluation standard: Same as in Table 4

As is apparent from Table 6, the dough improvers of the present invention (Test Groups III to VIII) show better effects than the other groups.

REFERENCE EXAMPLE 3

The effects of the dough improvers obtained in Examples 1 and 3 in cake making were compared with those of powder mixture of commercial vital gluten with sodium stearoyl-lactylate. Table 7 lists the test groups, and Table 8 shows the quality of cakes after one day's storage.

TABLE 7

| Test Group | Additive | Amount added (%) (per total flour) |
|---|---|---|
| I | None | — |
| II | Commercial vital gluten | 5 |
|  | Na stearoyl-lactylate | 0.375 |
| III | Dough improver A | 5 |
| IV | Dough improver G | 5 |

TABLE 8

|  |  | Test Group | | | |
|---|---|---|---|---|---|
|  |  | I | II | III | IV |
| Product Quality |  |  |  |  |  |
| Uniformity in shape |  | ∆~O | ∆~O | O | O |
| Specific volume |  | 3.95 | 4.09 | 4.28 | 4.21 |
| Film extension of crumb |  | ∆ | ∆~O | ◉ | ◉ |
| Crumb grain |  | O~◉ | O~◉ | ◉ | ◉ |
| Texture |  | ∆~O | O | ◉ | ◉ |
| Softness | Organoleptic test | ∆~O | O | ◉ | ◉ |
|  | Creepmeter (g/cm²) | 15.0 | 12.0 | 10.5 | 9.9 |

(Note)
1. Evaluation standard (organoleptic evaluation by skilled engineers)
◉ Excellent
O Slightly better
∆ Slightly poor
O~◉ Better
∆~O Average
2. Creepmeter measurement
Samples were cut from the center of each cake to 2 × 2 × 2 cm, and compressed by 3 mm.

As is apparent from Table 8, the dough improvers of the present invention (Test Groups III and IV) show better effects than the other Groups in improving the quality of cakes (particularly, crumb grain, texture and softness).

REFERENCE EXAMPLE 4

The effects of the dough improvers obtained in Examples 1 and 2 in improving the quality of cakes were tested. The results are shown in Tables 9 and 10.

TABLE 9

| Test Group | Additive | Amount added (%) (per total flour) |
|---|---|---|
| I | None | — |
| II | Commercial vital gluten | 5 |
| III | Dough improver A | 5 |
| IV | Dough improver B | 5 |
| V | Dough improver C | 5 |
| VI | Dough improver D | 5 |
| VII | Dough improver E | 5 |
| VIII | Dough improver F | 5 |

TABLE 10

|  |  | Test Group | | | | | | | |
|---|---|---|---|---|---|---|---|---|---|
|  |  | I | II | III | IV | V | VI | VII | VIII |
| Product Quality: |  |  |  |  |  |  |  |  |  |
| Uniformity in shape |  | ∆~O | ∆~O | O | O | O~◉ | O~◉ | O | O~◉ |
| Specific volume |  | 3.92 | 4.12 | 4.27 | 4.22 | 4.19 | 4.33 | 4.20 | 4.10 |
| Film extension of crumb |  | ∆ | ∆~O | ◉ | ∆~O | ∆~O | ∆~O | O | ∆ |
| Crumb grain |  | O~◉ | O | ◉ | O~◉ | O~◉ | O~◉ | O~◉ | O |
| Texture |  | ∆~O | ∆~O | ◉ | O | ◉ | O~◉ | O~◉ | O |
| Softness | Organoleptic test | ∆~O | ∆~O | ◉ | O | ◉ | O~◉ | O~◉ | O |
|  | Creepmeter (g/cm²) | 14.9 | 12.6 | 10.2 | 9.0 | 10.0 | 11.7 | 11.5 | 13.3 |

(Note)
Evaluation standard: Same as in Table 8

As is apparent from Table 10, the dough improvers of the present invention (Test Groups III to VIII) show better effects of improving the quality of cakes than the other Groups.

REFERENCE EXAMPLE 5

The dough improvers of the present invention obtained in Examples 1 and 2 were compared in dispersibility in water with the corresponding powder mixtures (commercial vital gluten plus emulsifier). The result is summarized in Table 11.

At first, 2 g of sample power and 3 ml of water were placed in a test tube, and the mixture was stirred with glass rod. The condition was observed at one-minute intervals, and dispersibility was evaluated based on the condition after 10 minutes' stirring.

TABLE 11

|  | Dispersibility in Water | |
|---|---|---|
| Emulsifier | Dough Improver | Powder Mixture |
| Na Stearoyl-lactylate | ◉ | X |
| Ca Stearoyl-lactylate | O | X |
| Diacetyltartaric acid ester of monoglyceride | ◉ | X |
| Succinic acid ester of monoglyceride | ◉ | X |
| Citric acid ester of monoglyceride | O | X |
| Fatty acid sucrose ester | O | X |

(Note) Evaluation standard
◉: No coagulation of gluten particles for more than 10 minutes.
O: No coagulation of gluten particles within 3 minutes, but coagulation observed within 10 minutes.
X: Coagulation starts immediately after addition of water As is apparent from Table 11, the dough improvers of the present invention are dispersed in water more readily than the corresponding powder mixtures of commercial vital gluten plus emulsifier.

What is claimed is:

1. A process for producing a dough improver composition consisting essentially of a vital gluten, an emulsifier selected from the group consisting of calcium stearoyl-lactylate, sodium stearoyl-lactylate, succinic acid ester of monoglyceride, citric acid ester of monoglyceride and fatty acid ester of sucrose and a complex of the vital gluten and emulsifier, which comprises the steps of mixing a vital gluten with a hydrated emulsifier to provide a mixture with a water content in the range of from 10 to 35% and allowing the mixture to stand to form the complex at 20° to 70° C. for 5 to 30 minutes at around neutral pH; the total content of emulsifier, including free emulsifier and emulsifier in the complex is from 1 to 30 weight % and the total content of vital gluten including free vital gluten and vital gluten in the complex is the remainder of the composition.

* * * * *